Nov. 26, 1935. G. B. SCHEIBELL Re. 19,768
PHOTOCELL COMPENSATING SYSTEM
Original Filed Aug. 1, 1930
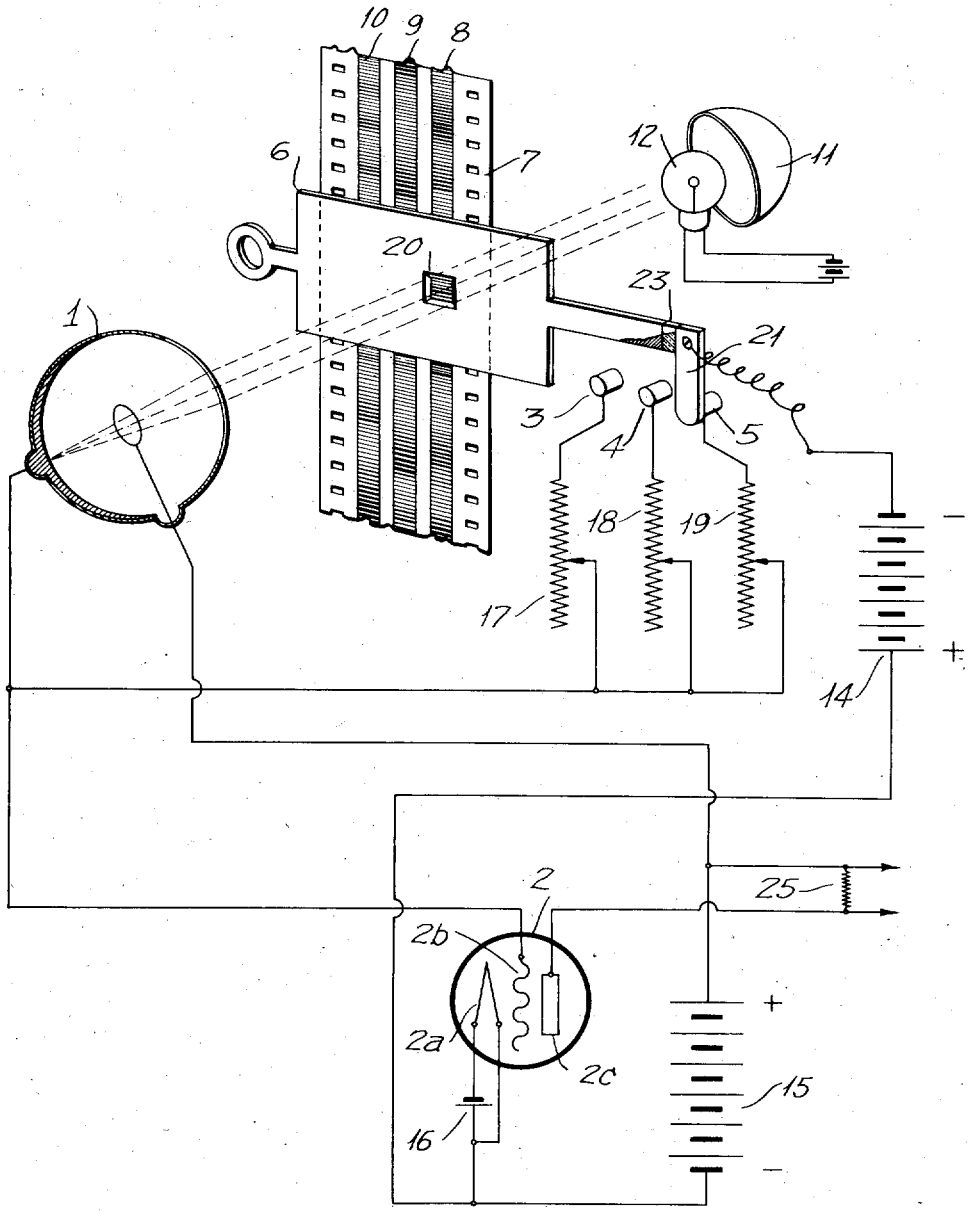
INVENTOR
Gordon Brown Scheibell
BY
Wm. J. Herdman
ATTORNEY Reissued Nov. 26, 1935

Re. 19,768

UNITED STATES PATENT OFFICE 19,768

PHOTOCELL COMPENSATING SYSTEM

Gordon Brown Scheibell, Short Hills, N. J.

Original No. 1,886,125, dated November 1, 1932, Serial No. 472,370, August 1, 1930. Reissue No. 19,245, dated July 17, 1934, Serial No. 692,276, October 5, 1933. This application for reissue October 17, 1934, Serial No. 748,719

29 Claims. (Cl. 179—100.3)

My invention relates broadly to light sensitive control circuits and more particularly to a compensation system for automatically compensating for permanent variations which tend to produce errors in the operation of light sensitive control circuits.

One of the objects of my invention is to provide a compensation circuit for light sensitive systems having means adapted to prevent change in the output of the light sensitive control circuit due to variations in structure which may occur within the light sensitive device.

Another object of my invention consists in producing a compensating circuit system for photosensitive resistances in which means are provided for compensating for extraneous and undesirable changes produced in the effective resistance of the circuit by relative movement of the photosensitive resistance and an exciting light therefor.

Still another object of my invention consists in producing a photoelectric cell compensation system in which a variable resistance is provided to compensate for changes in the effective resistance of a photocell circuit brought about by altering the relation of an exciting light with reference to the photoelectric cell.

A further object of my invention consists in producing a photoelectric cell compensation system in which light is selectively directed through a plurality of adjacent longitudinal portions of a photographic film upon the light sensitive cathode of a photoelectric cell and in which means are provided for avoiding undesirable changes in resistance of the photoelectric cell brought about by nonuniformity of the cathode structure.

A still further object of my invention consists in providing a photoelectric cell compensation system in which a photographic film is interposed between a photoelectric cell and an exciting light therefor and in which a calibrated resistance is provided to maintain the effective resistance of the photoelectric cell at a predetermined value when different parts of the photoelectric cell cathode are exposed to light rays.

Another object of my invention consists in providing a photoelectric cell system in which several conditions for varying the resistance of a photoelectric cell are present and in which means are provided for compensating for all of the resistance variations except one.

Other and further objects of my invention reside in the circuit arrangement described in the following specification and shown in the accompanying drawing which diagrammatically shows the compensation system of my invention.

In an electrical system for transforming light impulses into electrical impulses, there are two difficulties to be encountered. First, the photosensitive, or cathode, structure of the cell itself is not uniform. That is to say, if a beam of light is moved from one part of the cell to another, there will be a change in resistance even though the light beam remain of constant intensity. Second, the light which falls upon the cathode of the cell must be maintained at a constant basic intensity. In an electrical translating system there is usually some means for varying the intensity of the light in accordance with certain effects which are to be translated into electrical impulses. For example, in sound reproduction by films, the intensity of the light reaching a photocell is altered in intensity by silver deposits on the film which correspond to sound waves. The light beam passing through this film and falling on the cathode of the photocell must therefore have a basic, or initial, intensity which is substantially constant, or the intensity variations caused by the film will not be faithful reproductions of the sound record. Such a statement is equally true of other uses to which a photocell is put, such as in television. In any case, if the basic intensity of the exciting light varies, or if the light beam is shifted from one part of the photo-sensitive structure of the cell to another, the effective resistance of the photocell will be altered in a disturbing manner which distorts the true values of the expected translations.

In my copending application Ser. No. 440,541 filed March 31, 1930, issued as Patent No. 1,837,267, March 1, 1932, I have described a photocell optical system in which means are provided for establishing a plurality of light beams of equal intensity and means for converging these beams on a constant portion of a photosensitive cell. In this application, the means so provided maintain the optical and photosensitive components of the translation system at constant values at all times, the only variable quantity being the modulating element, such as a sound film.

In the present invention, I provide a photocell system in which the optical and photosensitive components are subject to variations, the same being compensated by changes in the values of the electrical circuit of which the cell is a part. In other words, I provide means for compensating for disturbing effects caused by changes in effective resistance by movement of light over different portions of the cell.

For the purpose of explaining my invention, the employment thereof as used in combination with a sound film will be illustrated, but it is not intended that its use shall be limited thereto. Other uses, especially in television, will readily occur to those skilled in the art.

In the drawing I show a multi-channel sound film 7 intercepting light rays from the light source 12 and reflector 11. These light rays pass through the sound tracks 8, 9, and 10 on the film 7 but are selectively chosen by the shutter 6 which brings the aperture 20 opposite any desired sound track. In the drawing, the aperture is opposite the sound channel 8, the light modulated thereby being permitted to pass on to the photoelectric cell 1. The photoelectric cell 1 is connected to control the operation of amplifier 2. The amplifier is illustrated diagrammatically as including a cathode 2a heated from battery 16, a control grid 2b, a plate 2c and a source of plate potential 15. The work circuit of the amplifier extends to a suitable load represented at 25 such as additional stages of amplification or to a sound reproducer circuit. The light rays defined by the aperture 20 when opposite the sound track 9 will obviously be of different intensity than the intensity of the beam formed by the aperture 20 when opposite the sound track 8 inasmuch as the light will be traversing different distances from the light source to the cathode of the photocell. Further, the light beams so defined at different positions will fall on different parts of the photosensitive cathode of the photoelectric cell. Due to non-uniformity of the cathode structure, this will cause a non-uniform change in resistance. If the aperture 20 is moved opposite the sound channel 10, there will still be another change of both the light beam and photocell resistance. It will be noted that either a change in intensity of the light beam or a change in point of incidence with the cathode will produce a change in resistance. In the present description, both changes are considered as occurring simultaneously and are therefore additive. It is of course possible that the light beams could be maintained at constant intensity of illumination by deriving them as set forth in my photocell optical system hereinbefore identified, and yet produce disturbing changes of resistance in the photocell by shifting the point where the light beam falls on the cathode. It is of course also possible that the point of incidence with the cathode might remain constant while the light intensity changes. At any rate, both cases will be considered simultaneously in this specification.

To compensate for these disturbing changes in resistance of the photocell, I provide an arm 21 affixed to the shutter 6 so that it moves therewith. This arm is electrically insulated from the shutter 6 as indicated at 23 but makes selective slidable connection with three contacts 3, 4, and 5 which are in series connection with three adjustable resistances 17, 18 and 19 respectively. The arm 21, being in series with the "C" battery 14, supplies current, through a selected one of the resistances 17, 18 and 19, to the photocell 1 and which is of the proper value to correspond to, and compensate for, the disturbing changes in resistance of the photocell brought about by shift of light beam and change in light intensity. The proper values of these resistances can be arrived at by calibrating the photocell circuit in accordance with the characteristics of the photocell structure and in accordance with the predetermined shifts of the light beam. It is of course obvious that other parts of the photoelectric circuit may equally well be varied to produce compensating changes. Further, the selection of these values is not necessarily limited to an arm mounted on a shutter, but could be any convenient means, such as an independent switch manually or automatically controlled.

While I have described my invention in one of its preferred embodiments I desire that it be understood that changes may be made and that no limitations are intended other than are imposed by the scope of the appended claims.

What I claim as new and desire to secure by Letters Patent of the United States is as follows:

1. A photosensitive cell compensation system comprising a source of irradiations, a photosensitive cell under control of said irradiations, an output circuit for said cell, a film interposed between said source of irradiations and said photo-sensitive cell, a shutter movable with respect to said film for selectively exposing different longitudinal portions of said film to said cell, and means under control of said shutter adapted to alter the constants of said circuit by predetermined values in definite relationship with the movement of said shutter.

2. A photosensitive cell compensation system comprising a source of irradiations, a photosensitive cell under control of said irradiations, a circuit for said cell including an adjustable resistance, a film interposed between said source of irradiations and said cell, a movable aperture plate adapted to selectively expose different longitudinal portions of said film, and means under control of said aperture plate, said means being adapted to render effective a selected value of said resistance in said circuit to compensate for certain effects produced in said photosensitive cell due to the movement of said aperture plate whereby the operation of said circuit is maintained substantially uniform irrespective of such changes.

3. A photoelectric cell compensation circuit comprising an electron tube having input and output circuits, a multiple channel sound record, a source of light focused upon said multiple channel sound record, a photoelectric cell connected with said circuits, an aperture plate adapted to be moved to a multiplicity of different positions for selectively directing light rays passing through a selected sound channel upon said photoelectric cell, and means controlled by the movement of said aperture plate for maintaining operating characteristics of said electron tube circuit substantially constant irrespective of changes in the position of incidence of the light rays on said photoelectric cell.

4. In a light sensitive cell circuit, an electron tube having a circuit to be controlled and a controlling circuit, a light sensitive cell connected in said controlling circuit, power energizing means for said circuits, a source of light rays, a multiple sound channel film record disposed in the path of said light rays, an aperture plate having a multiplicity of positions corresponding to the number of sound channels on said film record and adapted to selectively expose said light sensitive cell to the effects of light rays passing through a particular sound channel, and means actuated by the change in position of said aperture plate for varying the effective value of said power energizing means to compensate for certain effects produced in said cell due to a change in position of said aperture plate for maintaining the operation of said circuit to be controlled substantially uniform irrespective of such effects.

5. In a light sensitive cell circuit, an electron tube having a circuit to be controlled and a controlling circuit, a light sensitive cell connected in said controlling circuit, power energizing means for said circuits, a source of light rays, a multiple sound channel film record disposed in the path of said light rays, an aperture plate having a multiplicity of positions corresponding to the number of sound channels on said film record and adapted to selectively expose said light sensitive cell to the effects of light rays passing through a particular sound channel, a multiplicity of independently adjustable resistors disposed in circuit with said power energizing means, a switching device for rendering effective a selected resistor in circuit with said power energizing means and effectively in circuit with said electron tube circuits for varying the influence of said power energizing means upon said electron tube circuits for maintaining the operation of said circuit to be controlled substantially uniform, and a member common to said aperture plate and said switching device for causing the simultaneous movement thereof.

6. In a compensating system, photosensitive means, means for producing irradiations for said photosensitive means, an electrical circuit external of said photosensitive means, a plurality of film recorded sound tracks, and means interposed in the path of said irradiations and adapted to simultaneously alter the constants of said external circuit and direct said irradiations through a selected one of said sound tracks to said photosensitive means.

7. A photosensitive cell compensating system comprising, a source of irradiations, a photosensitive cell, a circuit connected to said cell, an aperture plate interposed between said source of irradiations and said photosensitive cell, for causing irradiations to fall on a predetermined area of said photosensitive cell, an adjustable electrical control device for altering the constants of said circuit and means for simultaneously moving said aperture plate and said adjustable control device.

8. A compensating system comprising a source of irradiations, a photosensitive cell under control of said irradiations, a circuit for said cell, a film interposed between said source of irradiations and said cell, means for causing said irradiations to sequentially pass through different longitudinal portions of said film to said cell, and means under control of said last mentioned means for altering the constants of said circuit by predetermined values.

9. A compensating system comprising photosensitive means, means for producing irradiations incident upon said photosensitive means, an electrical circuit external of said photosensitive means and having a plurality of different values of circuit constants, and means movable in the path of said irradiations for causing changes in the incidence of said irradiations with respect to said photosensitive means, said means being adapted to render selected values of said circuit constants effective in said circuit to compensate for said changes in the incidence of said irradiations on said photosensitive means whereby the operation of said circuit is maintained substantially uniform irrespective of said changes.

10. A photosensitive system comprising, photosensitive means, a circuit controlled thereby, means for producing irradiations for said photosensitive means, movable aperture means interposed between said means for producing irradiations and said photosensitive means for controlling the irradiations incident upon said photosensitive means, movable electrical controlling means for controlling said circuit in addition to the controlling effect thereon exercised by said photosensitive means, and means for conjointly operating said aperture means and said movable electrical means for interdependently controlling said circuit through said photosensitive means and through said electrical controlling means.

11. A compensating system comprising, photosensitive means for producing an electrical controlling operation in accordance with incident irradiations, means for producing irradiations for said photosensitive means, means movable in the path of said irradiations producing desired and undesired variations in said irradiations incident on said photosensitive means, and means controlled by said last mentioned means for modifying the effective controlling operation of said photo-sensitive means to compensate for certain of said variations.

12. In a system in which means movable in the path of irradiations incident upon photosensitive means produce desired and undesired illumination variations, the method of maintaining the operation of said photosensitive means effectively constant except for desired variations of illumination which comprises modifying the controlling effect of said photosensitive means in accordance with the undesired variations in illumination produced by said movable means.

13. A photosensitive system comprising, an electrical circuit system, photosensitive means for exerting a controlling effect upon said circuit, means for producing irradiations incident on said photosensitive means, light shutter means for controlling said irradiations, and electrical means for controlling said circuit system in addition to the controlling effect exerted by said photosensitive means, said shutter means and said electrical means being effectively interdependently operative whereby a change in the condition of control of said irradiations due to said light shutter means is accompanied by a change in the condition of control of said circuit system due to the operation of said electrical means.

14. A photosensitive system comprising, photosensitive means, means for producing the excitation of said photosensitive means with irradiations having variations therein, an electrical circuit effectively connected with said photosensitive means and having an amplifying device for producing an amplified electric current effectively controlled by said photosensitive means, and electrical means controlled by said second mentioned means for controlling the effective operation of said amplifying device in addition to the controlling effect of said photosensitive means to compensate for certain of said variations in said irradiations.

15. In a photosensitive system in which photosensitive means are subjected to irradiations having desired and undesired variations therein producing energy variations through said photosensitive means, the method of variably amplifying said energy variations of said photosensitive means in accordance with said undesired variations of said irradiations for producing the effective uniform amplification of the energy variations through said photosensitive means which correspond to said desired variations of said irradiations.

16. In a photosensitive system in which irradiated photosensitive means produce desired and undesired energy variations, the method of variably amplifying said energy variations in which the variations of amplification correspond to said undesired energy variations of said photosensitive means whereby said desired energy variations are effectively constantly amplified.

17. In a photosensitive system in which irradiated photosensitive means deliver desired and undesired energy variations to an electrical amplifier, the method of controlling said amplifier in addition to the controlling effect of said energy variations which consists in independently applying energy to said electrical amplifier for modifying the amplification effect thereof, said energy applied thereto being varied in value in accordance with said undesired energy variations of said photosensitive means.

18. A photosensitive system comprising, energized photosensitive means producing desired and undesired energy variations when irradiated, an electrical amplifying system under control of said energy variations, and electrical means for supplying other and further energy to said electrical amplifying device for modifying the amplification effect thereof, said electrical means operating to automatically vary the value of said energy supplied to said amplifying system in accordance with said undesired energy variations of said photosensitive means.

19. A control method comprising, directing irradiations with reference to a film, predetermining the value of the electrical resistance of a circuit in accordance with irradiation conditions, exposing photosensitive means to said irradiations and controlling said circuit therewith, and interdependently altering the value of the electrical resistance of said circuit and the condition of said irradiations directed with reference to said film.

20. A record reproducing control system comprising, a plurality of records, electrical means subject to control by said records for effecting the production of variable electrical energy in accordance with said records, amplification means for amplifying said energy variations, and commonly operable means for selecting said records to control said electrical means and interdependently adjusting the amplification of said amplifying means in accordance with conditions of selection of said records.

21. A record reproducing control system comprising, a plurality of records, circuit means subject to control by said records for effecting the production of electrical energy variations, adjustable electrical means for providing differing values of electrical energy in said circuit means supplementing said energy variations, and selection means for effecting different conditions of record selection for controlling said circuit means, said adjustable electrical means being subject to control by said selection means for providing a certain value of electrical energy in said circuit means for one predetermined condition of said selection means and another value of electrical energy therein for another predetermined condition of said selection means.

22. A compensation system comprising, energized sound circuit means, a plurality of different sound modulation control means for controlling said circuit in a sound translation process and producing a plurality of different sound modulation controlling conditions, and commonly operated means for producing an effective selection operation among said control means and interdependently changing the electrical operation of said circuit to compensate for unwanted electrical variations therein due to said selection operation whereby the effective operation of said circuit is maintained substantially uniform.

23. A compensation system in accordance with claim 22 in which said sound circuit means includes photosensitive means, said plurality of sound modulation control means comprise a plurality of different film recorded sound records, and in which said commonly operated means includes a plurality of selectable predetermined values of resistances calibrated in accordance with said unwanted electrical variations for interdependently changing the electrical operation of said circuit by producing compensating energy changes therein.

24. A sound circuit control system comprising, sound circuit means including an amplifier, a plurality of control means for controlling said circuit means in different sound amplification processes and producing a plurality of different controlling conditions, selection means for producing an effective selection among said sound control means, and means operated by said selection means for changing the amplification of said amplifier in accordance with changes of selection.

25. The method of controlling the volume of sound reproduction for photophonographic apparatus comprising the step of simultaneously and similarly varying both the electrical and the luminous excitation of a photoelectric cell.

26. A sound circuit control system comprising, means for producing irradiations, photosensitive means under control of said irradiations, sound amplification means subject to control by said photosensitive means, a film having sound record means thereon for controlling said photosensitive means to produce desired energy variations in said sound circuit, additional means for causing irradiations to sequentially pass through different longitudinal portions of said film to said photosensitive means, and means under control of said additional means for effecting a controlling operation to produce varying values of energy, in addition to said desired energy variations, for controlling the effective operation of said sound amplification means to maintain the operation thereof uniform in the reproduction of sound, said varying values of energy corresponding to amounts of departure from non-uniformity to which said amplification means may be subjected.

27. A sound circuit control system comprising, the combination with sound track record means and means for producing sound amplification effects therefrom including an electron amplifier, of movable light aperture means which, in the movement thereof, tends to cause undesired variations in reproduced sound, and control means operated under control of said aperture means and in accordance with the movement of said aperture means for producing energization controlling operations to correct said undesired variations and thereby maintain uniform the amplification of desired sound variations by said amplifier.

28. A sound circuit control system comprising, photosensitive means, means for producing irradiations for said photosensitive means, sound amplification means subject to control by said photosensitive means, means movable in the path of said irradiations producing desired and undesired variations in said sound amplification means, means operated by said last mentioned means for variably controlling an energization supply, and an arrangement for utilizing said variably controlled energization supply for correcting said undesired variations to maintain a uniform amplication of sound in accordance with said desired variations.

29. Photophonographic apparatus comprising photosensitive means effectively operative in a sound reproducing system, means for electrically exciting said photosensitive means, means for luminously exciting said photosensitive means, and an arrangement for controlling the volume of reproduced sound comprising means for simultaneously and similarly varying both the electrical and luminous excitation of said photosensitive means.

GORDON BROWN SCHEIBELL.